United States Patent
Mosko

(10) Patent No.: US 8,130,657 B2
(45) Date of Patent: Mar. 6, 2012

(54) NETWORK ROUTING USING A RETRANSMISSION-TIME-BASED LINK METRIC

(75) Inventor: Marc E. Mosko, Santa Cruz, CA (US)

(73) Assignee: Palo Alto Research Center Incorporated, Palo Alto, CA (US)

(*) Notice: Subject to any disclaimer, the term of this patent is extended or adjusted under 35 U.S.C. 154(b) by 520 days.

(21) Appl. No.: 12/050,612

(22) Filed: Mar. 18, 2008

(65) Prior Publication Data

US 2009/0238075 A1 Sep. 24, 2009

(51) Int. Cl.
*G01R 31/08* (2006.01)
(52) U.S. Cl. .................. 370/238; 370/351; 709/241
(58) Field of Classification Search .......... 370/236, 370/238, 335, 337, 347–348, 252; 709/241
See application file for complete search history.

(56) References Cited

U.S. PATENT DOCUMENTS

| | | | | |
|---|---|---|---|---|
| 2005/0185632 A1* | 8/2005 | Draves et al. | ........... | 370/351 |
| 2007/0002804 A1* | 1/2007 | Xiong et al. | ........... | 370/335 |
| 2007/0183334 A1* | 8/2007 | White et al. | ........... | 370/238 |
| 2008/0049620 A1* | 2/2008 | Riga et al. | ........... | 370/236 |

OTHER PUBLICATIONS

Misra et al, Minimum Energy Paths for reliable communication in Multi hop Wireless networks, IEEE 2002.*
Zhai et al, Performance analysis of IEEE 802.11 MAC protocols in wireless LANs, 2004.p. 917-931.*
De Couto, Douglas S. J., A High-Throughput Path metric for Multi-Hop Wireless Routing, Sep. 14-19 2003, http://pdos.csail.mit.edu/grid/pubs.html, downloaded Mar. 21, 2008.
Khuu, Phong C., et al., "Integrating Local Neighborhood Congestion and Path Stability into QoS Routing for Tactical Networks", BAE-systems, pp. 1-7, IEEE, 1-4244-1513-06/07, Oct. 2007.

* cited by examiner

*Primary Examiner* — Aung S Moe
*Assistant Examiner* — Vincelas Louis
(74) *Attorney, Agent, or Firm* — Shun Yao; Park, Vaughan, Fleming & Dowler LLP

(57) ABSTRACT

A system computes link costs for a multi-hop wireless network. During operation, the system receives topological information for the multi-hop wireless network which includes a set of nodes, a set of links, and a success probability for a respective link. The system then obtains an average media access time for the multi-hop wireless network. The system also obtains a retransmission time for a respective node in the set of nodes. Next, the system computes a link metric value for a respective link based on the corresponding link success probability, the average media access time, and the corresponding retransmission time. The system then produces a link cost for the link based on the associated link metric value.

20 Claims, 5 Drawing Sheets

NETWORK ROUTING USING A RETRANSMISSION-TIME-BASED LINK METRIC

BACKGROUND

1. Field of the Invention

Embodiments of the present invention generally relate to techniques for routing data in a network. More specifically, embodiments of the present invention relate to a method for performing routing in a multi-hop network based on a retransmission-time-based link metric.

2. Related Art

In a multi-hop routing network, a path or a route (used interchangeably throughout) between a source node and a destination node is comprised of a set of hops or links. Here a hop or a link (used interchangeably throughout) is defined as a logically direct communication path (either wired or wireless) between a pair of adjacent nodes. A respective link in the multi-hop routing network is typically associated with one or more link metrics, which can be used to compute a cost associated with using the link for data transmission. A path cost can then be computed as a sum of the link cost on each link comprising the path. Next, a multi-hop routing protocol is used to select a path between a source node and a destination node based on the associated path cost to facilitate efficient routing through the multi-hop wireless network.

For example, one routing protocol seeks a route with a minimum hop count, or a "min-hop." In this protocol, the link metric used by the protocol simply assumes that each link has a cost of "1" and the path cost equals the number of hops within the route. Another routing protocol searches for a route with the minimum latency or delay. In this protocol, the link metric used by the protocol is the link traversal time, and a path cost is the sum of each link traversal time over the path. Sometimes, a routing protocol may consider more than one type of link metric, and seek a path based on a trade-off among multiple link metrics.

Note that the aforementioned minimum delay metric provides a good path-cost estimation in a wired network. This is because a wired network generally exhibits a high success rate in data transmission. Hence, link delays are relatively deterministic and easy to obtain, for example, by measuring a round-trip (RT) time. However, in a time division multiple access (TDMA)-based wireless network, a link delay can be affected by a number of nondeterministic factors which make the link cost difficult to compute. These factors can include queuing delay due to TDMA scheduling, medium access delay for waiting until medium becomes idle to avoid collision, and retransmission delay due to data transmission failures. Consequently, in a TDMA wireless network, the aforementioned link metrics are not sufficient to accurately represent a link cost.

SUMMARY

One embodiment of the present invention provides a system that computes link costs for a multi-hop wireless network. During operation, the system receives topological information associated with the multi-hop wireless network. This topological information specifies a set of nodes, a set of links and a success probability $p_i$ for a respective link i which indicates the probability of successfully transmitting a packet from a first node coupled to the link to a second node coupled to the link. The system then obtains an average media access time for the multi-hop wireless network. The average media access time is approximately the time from when a media access control (MAC) layer first receives a packet to the time when the packet is transmitted onto a transmission medium. The system also obtains a retransmission time for a respective node in the set of nodes, which is approximately a delay associated with retransmitting a packet by a node after a failed transmission. Next, the system computes a link metric value for a respective link based on the corresponding link success probability, the average media access time, and the corresponding retransmission time. The system then produces a link cost for the link based on the associated link metric value.

In a variation on this embodiment, the system determines a routing path between a source node and a destination node in the multi-hop wireless network based on the link costs associated with the set of links. In doing so, the system finds one or more paths between the source node and the destination node, computes an overall link cost for each of the paths, and selects a path between the source node and the destination node which has a minimum overall link cost.

In a variation on this embodiment, the average media access time is link-independent.

In a variation on this embodiment, the wireless network is a time division multiple access (TDMA)-based network. The system obtains the retransmission time for the node by computing the retransmission time as a function of one or more of the following: a congestion window size; a slot time within a TDMA frame; and a time slot schedule.

In a variation on this embodiment, the wireless network is a contention-based network, such as a 802.11 based-network. The system obtains the retransmission time for a node by computing the retransmission time as a function of one or more of the following: a congestion window size; a congestion backoff time; and an error backoff time, such as an extended inter-frame space (EIFS).

In a variation on this embodiment, the retransmission time is substantially equal to a back-off time for the multi-hop wireless network.

In a variation on this embodiment, the system computes the link metric value for the link by computing an expected retransmission time (ERT) such that $ERT = E_f \times R + Q$. $E_f$ represents an expected number of failures associated with a successful packet transmission on the link; R represents the retransmission time associated with the link; and Q represents the average media access time for the multi-hop wireless network. Note that the ERT value has a unit of time.

In a further variation on this embodiment, the system computes $E_f$ based on the link's success probability $p_i$ under a geometric distribution.

In a further variation, the system computes $E_f$ according to formula:

$$E_f = \frac{1 - p_i}{p_i}.$$

In a further variation, the system computes the link's success probability $p_i$ based on a packet success probability for a forward link within the link and a packet success probability for a reverse link within the link.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

The data structures and code described in this detailed description are typically stored on a computer-readable storage medium, which may be any device or medium that can store code and/or data for use by a computer system. This includes, but is not limited to, volatile memory, non-volatile memory, magnetic and optical storage devices such as disk drives, magnetic tape, CDs (compact discs), DVDs (digital versatile discs or digital video discs), or other media capable of storing computer readable media now known or later developed.

Overview

Embodiments of the present invention introduce a link metric that represents an expected time for completing a round-trip exchange on a network link between a pair of network nodes coupled to the link. More specifically, the proposed link metric includes a retransmission time for a link, which is approximately a delay required to retransmit a packet on the link after a failed transmission on the link. Additionally, the link metric computes an expected number of failures for each success of transmitting a packet on the link based on the link reliability. In one embodiment of the present invention, the link reliability includes packet loss rates of both a forward link and reverse link of the link. The metric is additive, and satisfies the triangle inequality, and therefore is applicable to standard routing protocols.

Multi-Hop Wireless Network and Retransmission

Figure 1:
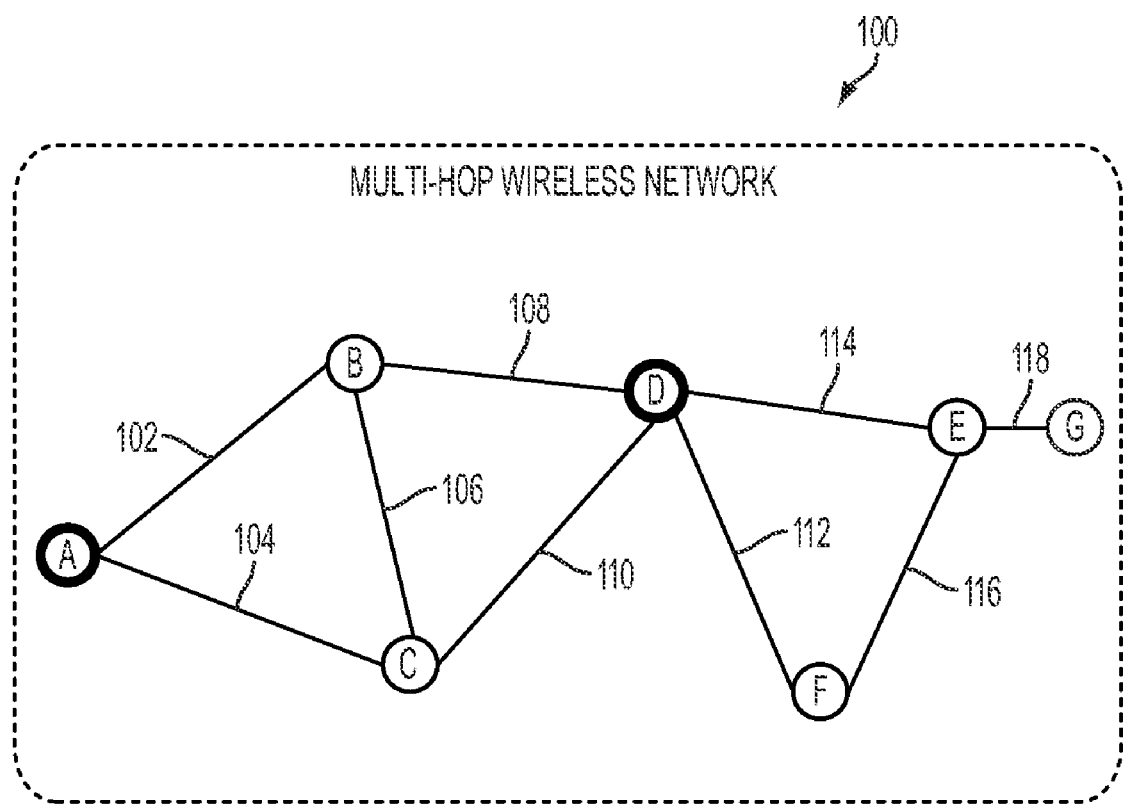
FIG. 1 illustrates an exemplary multi-hop wireless network in accordance with an embodiment of the present invention.

FIG. 1 illustrates an exemplary multi-hop wireless network 100 in accordance with an embodiment of the present invention.

Specifically, network 100 includes a set of communication nodes A, B, C, D, E, F, and G, wherein each communication node is equipped with a radio transmission and receiving device. The set of communication nodes transmit data through the network via a set of links 102-118. For example, nodes A and B can transmit data to each other through link 102, nodes A and C can transmit data to each other through link 104, and nodes B and C can transmit data to each other through link 106. Note that each link is associated with one or more link metrics which can be used to compute a cost associated with transmitting data on the link. Also note that each link within network 100 can include a forward channel and a reverse channel between a pair of nodes coupled to the link.

Hence, each link in FIG. 1 can be viewed as a bi-directional communication channel which allows data to flow in either direction.

Figure 2:
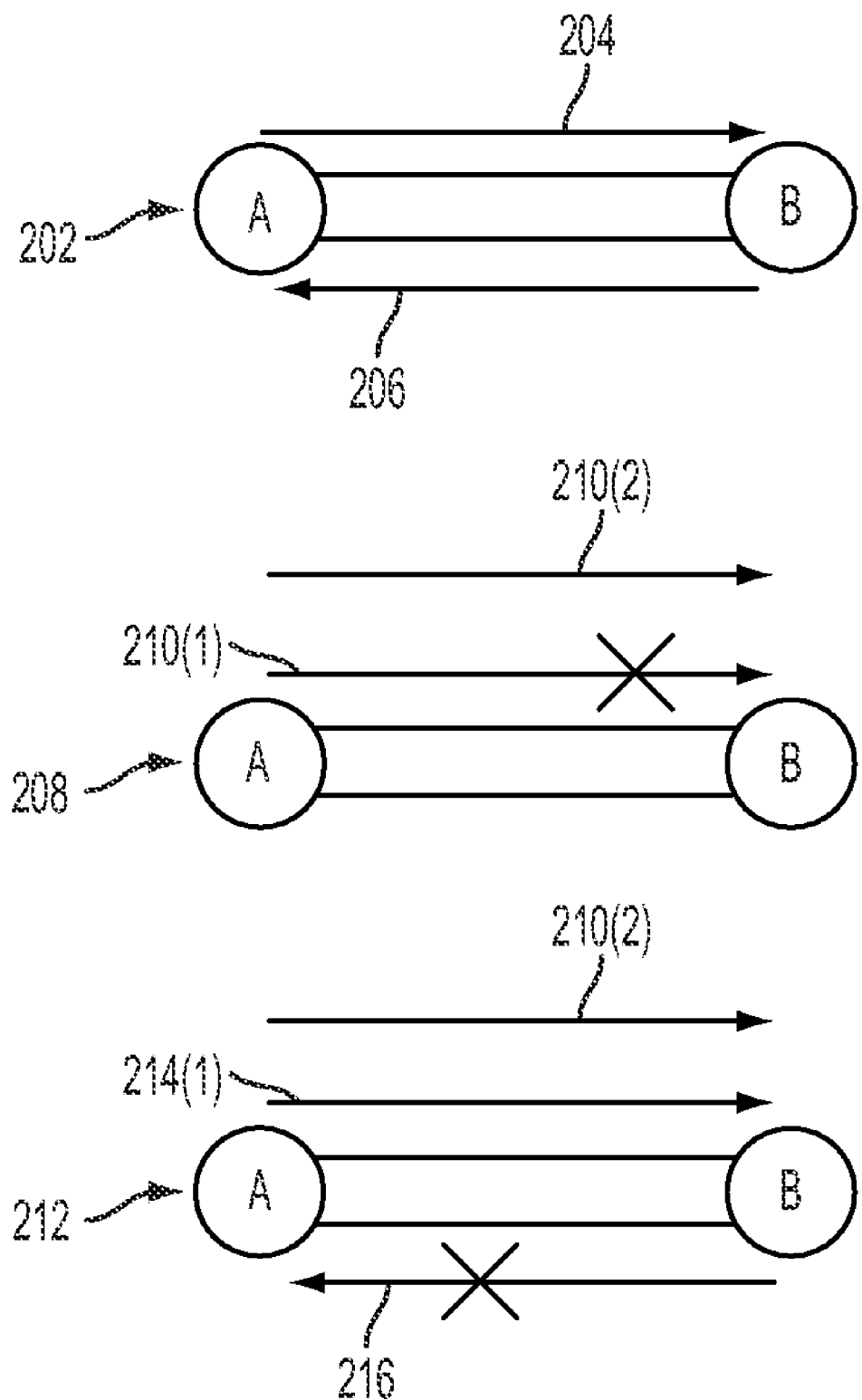
FIG. 2 illustrates various scenarios associated with a handshake protocol for controlling data communication between nodes A and B in accordance with an embodiment of the present invention.

In one embodiment of the present invention, each link in FIG. 1 is associated with a forward packet loss rate and a reverse packet loss rate, which a respective packet loss rate is a ratio of a number of lost packets due to failed transmission to a total number of packets transmitted. Note that in order to combat packet loss in the multi-hop network, a handshake protocol can be used to perform transmission control. FIG. 2 illustrates various scenarios associated with a handshake protocol for controlling data communication between nodes A and B in accordance with an embodiment of the present invention.

As shown in scenario 202 of FIG. 2, node A successfully transmits a data packet 204 to node B while node B successfully acknowledges node A of receiving the data packet with an ACK 206. In this scenario, no retransmission is required for node A.

In some embodiments, a system can use an "implicit" ACK rather than an "explicit" ACK such as ACK 206. In scenario 202, node A can use node B's retransmission of the received DATA 204 as an acknowledgement instead of requiring node B to generate an extra explicit ACK packet 206.

As shown in scenario 208 of FIG. 2, node A fails to transmit a data packet 210 to node B. Because node B does not receive the data, no ACK was send from node B to node A. After a predetermined timeout after packet 210 was send, node A determines that the data is lost. In this scenario, a retransmission of data packet 210 is typically required for node A. Note that the time between two consecutive transmissions of data packet 210 is referred to as a "retransmission time" or a "retry time."

As shown in scenario 212 of FIG. 2, node A successfully transmits a data packet 214 to node B but node B fails to transmit ACK 216 to node A. After a predetermined timeout after packet 210 was send, node A determines that the data was lost (because node A cannot distinguish between scenarios 208 and 214). In this scenario, a retransmission of data packet 214 is typically required for node A.

Note that for each retransmission, additional time is added to the total time of successfully sending a packet. Consequently, retransmission induced link cost can be significant in data routing on links associated with low reliability (i.e., high packet loss rate).

Note that depending on the transmission protocol used, there can be other scenarios not illustrated in FIG. 2 that can result in a retransmission by node A to occur. Hence, FIG. 2 is not intended to exhaust all retransmission scenarios.

Referring back to FIG. 1, note that node A and node D do not have a direct link in between. This can be a result of the distance between the two nodes longer than the range of the radio devices of these nodes. Hence, to transmit data from node A to node D, a multi-hop path is used. Specifically in network 100, node A can send data packet to node D through one of (1) path 102-108; (2) path 104-110; (3) path 102-106-110; or (4) path 104-106-108. In one embodiment of the present invention, a multi-hop routing protocol is then used to compute the path cost of each of the four candidate paths and selects one with the minimum path cost. Note that node D transmits to node A using each of the four paths in a reverse direction.

In one embodiment of the present invention, networking 100 is a TDMA-based wireless network.

Multi-Hop Wireless Network with TDMA Channels

TDMA is a channel access scheduling mechanism which divides data communication resource between radio channels (i.e., communication nodes) by regulating the access to the resource, such as transmission medium. More specifically, TDMA scheduling decides for each node in the network when to transmit and when to expect receiving data. This scheduling is accomplished by dividing the time on the channel into "time slots," which are generally of fixed size. Each node within the network is allocated a certain number of slots during which the node can transmit. During the time slots not assigned to the node, the node has to wait for its turn. Time slots are typically organized in a frame, which is repeated on a regular basis. Links in a multi-hop wireless network using TDMA scheduling are typically referred to as TDMA channels.

A TDMA channel in a multi-hop network typically comprises a forward link and a reverse link between a pair of communicating nodes, and a multi-hop path is comprised of a series arrangement of such channels. In one embodiment of the present invention, each TDMA channel is associated with a packet loss rate for the forward link and a packet loss rate for the reverse link. In one embodiment of the present invention, a link metric for the TDMA channel is obtained based on the packet loss rates.

One technique that uses the packet loss rates to compute link cost for IEEE802.11 (WiFi) networks is described in "High-throughput path metric for multi-hop wireless routing," by D. DeCouto, D. Aguayo, J. Bicket, R. Morris, MobiCom 2004 (DeCouto hereafter). Specifically, Decouto proposed an Expected Transmission Count (ETX) link metric, which estimates to number of transmissions of a DATA/ACK pair required to complete transmitting a data packet. This ETX metric is computed based on estimated packet loss rates of the transmission channel. For example, if $p_s$ and $p_r$ represent the packet success probabilities (i.e., 1—packet loss rate) for the sender and receiver respectively, the link success rate for a successful handshake is then $p_{link}=p_s \times p_r$, and therefore $ETX=1/(p_s \times p_r)$. Note that ETX is the link cost in DeCouto, and to get a path cost, ETX values are summed over an entire path. Draves extends the ETX metric by additionally considering the lengths of data packets being transmitted (see R. Draves, J. Padhye, B. Zill, "Routing in multi-radio, multi-hop wireless mesh networks," MobiCom 2004). More specifically, Draves computes an Estimated Transmission Time (ETT) based on the ETX value and the size of a data packet, such that ETT=ETX×(air time of a data packet).

However, both the ETX and the ETT techniques assume the primary cost on the links is associated with the burden of multiple transmissions while retransmissions occur in very rapid successions. In other words, they assume the cost of transmission essentially equals the cost of retransmission. However, both of these metrics are not sufficient for TDMA-based multi-hop routing because the time delay cost of retransmission typically greatly exceeds the cost of a single transmission in a TDMA network.

As mentioned above, in a TDMA network, nodes transmit in assigned time slots, and there can be a significant latency between transmission slots. For example, in a TDMA network using 1 millisecond (msec) slots, there may be a 20 msec latency between transmission slots. In this example, the retransmission cost is much higher than the transmission cost, because a retransmission cannot happen any faster than once every 20 msec. Note that actual retransmission times for different nodes in a TDMA system can vary greatly and are difficult to predict. For example, when node A sends a data packet to node B, node A has to wait until node B obtains an available slot to send an ACK back to node A. However, if no ACK is sent back from B due to a large queuing delay at node B (e.g., node B is occupied with talking to node C), node A can experience a long retransmission time.

One embodiment of the present invention computes a link metric, referred to as an Expected Retransmission Time (ERT), to capture the link cost associated with retransmissions in a TDMA-based wireless network. In one embodiment of the present invention, an ERT is a function of a set of link parameters.

In one embodiment of the present invention, the link parameters considered by the ERT for a specific link i include a retransmission time $R_i$ for the sender node coupled to link i, wherein $R_i$ is approximately the delay required to retransmit a packet by the sender after a failed transmission on the link. Note that $R_i$ can depend on both a specific Medium Access Control (MAC) protocol and a transmission protocol used by the network, and can be distinct for different nodes. In another embodiment of the present invention, retransmission time R is an average retransmission time for all nodes. In this embodiment, R is computed based on global parameters such as global back-offs or global contention windows, but not node specific. We provide more detail on computing the retransmission time below.

In one embodiment, link parameters of link i considered by the ERT also include a link's success probability $p_i$, which specifies a probability of successfully transmitting a packet from a sender node coupled to a link i to a receiver node coupled to the link i. Note that in a DATA/ACK protocol, success probability $p_i$ measures the probability of successfully sending the DATA by the sender on a forward link and successfully sending the ACK by the receiver on a reverse link. In one embodiment, if $p_s$ and $p_r$ represent the packet success probabilities (i.e., 1—packet loss rates) for the forward link and the reverse link within link i respectively, success probability $p_i$ is then $p_s \times p_r$.

In one embodiment of the present invention, ERT value is also affected by an average media access time Q, which is approximately the time from when the MAC layer first receives a packet to the time when the packet is transmitted onto a transmission medium (e.g., air). In one embodiment, media access time Q is not link specific. In other words, a common value for Q can be used to compute ERT for all the links in a path.

In one embodiment of the present invention, ERT value for link i is computed based on the following formula:

$$ERT_i = E_f \times R_i + Q, \qquad \text{Eqn. 1}$$

wherein $E_f$ represents an expected number of failures associated with a success of transmitting a packet on the link. This formula indicates that the link cost can be significantly higher on an unreliable link (which has a large $E_f$) than on a highly reliable link (which has a small or zero $E_f$). In one embodiment, $E_f$ is computed based on the link's success probability $p_i$ under a specific probability distribution. For example, if a geometric distribution is assumed, $E_f$ is computed based on formula:

$$E_f = \frac{1 - p_i}{p_i}. \qquad \text{Eqn. 2}$$

Hence, the link metric ERT becomes:

$$ERT_i = \frac{1-p_i}{p_i} \times R_i + Q. \qquad \text{Eqn. 3}$$

Note that if an average retransmission time is considered, then $R_i=R$ for all links.

Figure 3:
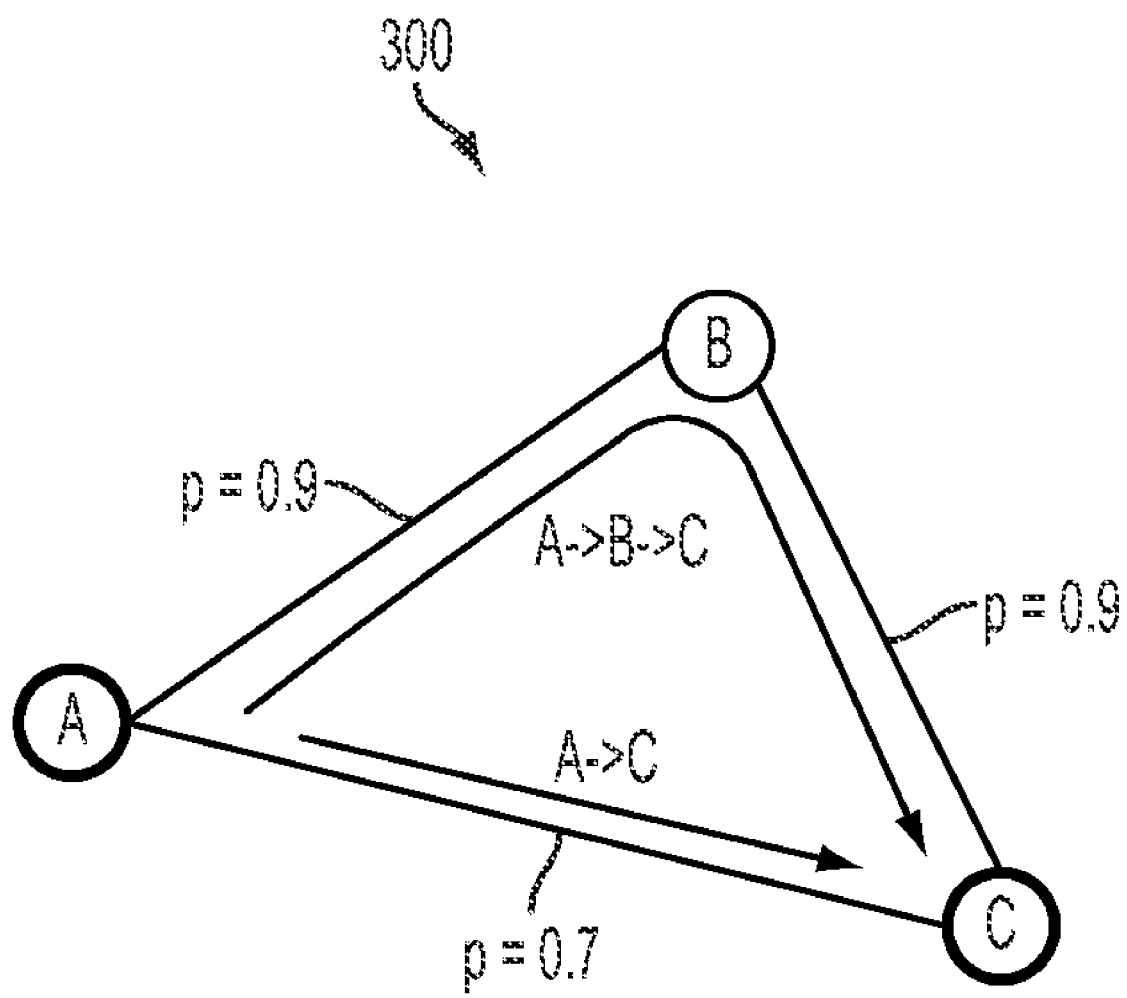
FIG. 3 illustrates a simple multi-hop TDMA network with three nodes and three links in accordance with an embodiment of the present invention.

The following example compares the results of multi-hop path selection based on either the ETX metric or the ERT metric. Refer to FIG. 3, which illustrates a simple multi-hop TDMA network 300 with three nodes and three links. As shown in FIG. 3, the links between nodes A and B and between nodes B and C are highly reliable links which both have link success rate of 0.9, whereas the link between nodes A and C has a lower link success rate of 0.7. To route data from source node A to destination node C, either path A-B-C or path (i.e., link) A-C can be used. Suppose each node in network 300 is associated with a 1 msec time slots and a 20 msec inter-slot latency, one can calculate that the expected path latency of path A-B-C is 2×(0.9×1 msec+0.1×20 msec) =5.8 msec, while path A-C is 0.7×1 msec+0.3×20 msec=6.7 msec. Consequently, it is desirable to route packets on the A-B-C path which has a shorter path latency rather than the direct A-C path which has a longer path latency.

If the ETX metric is used, the A-B and B-C links both have an ETX metric of 1/0.9, so the path ETX metric is 2/0.9=2.22. Because the A-C link has a path metric of 1/0.7=1.43, a routing protocol based on the ETX metric would prefer the A-C path. Note that using the ETT metric will lead to similar results.

Now consider the same routing problem with the ERT metric. Note that the average media access time Q is just the length of the time slot of 1 msec. Using Eqn. 3, the ERT metrics of each link are computed as: ERT_AB=ERT_BC=0.1/0.9×20+1=3.2 msec and ERT_AC=0.3/0.7×20+1=8.6 msec. Hence, the path metric for A-B-C is ERT_ABC=6.4 msec and path metric for A-C is ERT_AC=8.6 msec. Consequently, a routing protocol using ERT metric would select path A-B-C which has a lower path cost based on the ERT. Hence, the ERT based routing protocol selects the route with the lower path latency. Note that one important difference between the above two routing techniques is that the ERT technique considers retransmission times whereas ETX/ETT technique does not.

Exemplary Implementation

Eqn. 1 provides a more general formula for computing ERT link metrics. However, the R parameter and the Q parameter may be computed differently for different systems, such as 802.11 systems and TDMA systems.

We now describe a more detailed implementation example of the ERT-based routing protocol on a network system based on 802.11 protocols. However, the following discussion can also be applied to other types of TDMA wireless systems, such as TDMA-based MAC protocols like WiMax 802.16 or military TDMA systems.

Recall that in Eqn. 2, the Q parameter is the average media access time. This is the time from when the MAC layer initially receives a packet to the time that the packet is sent out on the air. In one embodiment of the present invention, Q is a system average, not specifically dependent on the neighboring nodes. In a typical 802.11 system, Q can be approximated as the time from which a device driver receives a packet in the packet buffer to the time the driver receives an interrupt from the hardware indicating that the corresponding packet is processed.

Note that the Q parameter can be considered as the contention delay, which can depend on many factors. These factors can include but are not limited to, the number of nodes in the system, the loads to the nodes, and the transmitting speed of the network. Because of the differences in hardware of different 802.11 systems, a one-to-one correspondence between packets and hardware interrupts may not always exist. Hence, estimating the Q parameter can vary from system to system. In one embodiment, estimating the Q parameter involves knowing the specific hardware configuration.

Recall that in Eqn. 2, the R parameter can be computed as either a global average retransmission time or a node-specific retransmission time. We now discuss some embodiments to compute the R parameter as a global average retransmission time.

Note that within an 802.11 system, the retransmission time R can be computed based on the congestion window (CW) of the system. In one embodiment, the R parameter corresponding to a backoff time on an error can be computed using:

$R=\frac{1}{2} \times CW \times aSlotTime+EIFS$, wherein CW represents a current congestion window size, aSlotTime represents the quanta in which a particular 802.11 system measures contention backoff, and EIFS is the Extended Inter Frame Space for the 802.11 system. In some embodiments, the 802.11 standard does not provide a way for a device driver to know the current CW of the system, except the bounds to the CW value, i.e., a minimum value CWmin and a maximum value CWmax. In these embodiments, the corresponding backoff time due to an error would be computed as:

$R=\frac{1}{4} \times (CW_{min}+CW_{max}) \times aSlotTime+EIFS$.

In some embodiments, the R parameter can be considered as the average retry interval. In some other embodiments, the R parameter does not have to be equal exactly to the average retry interval. However, it is desirable that each node estimates the R parameter in the same manner for the link metric measurement. Note that in some systems, such as TDMA systems, it may be possible to more precisely calculate the R parameter based on predetermined schedules of the nodes.

The following provides a method for estimating CW value in an 802.11 system using values from the dot11 MIB [80211, Annex D]. In dot11 MIB, the dot11RTSThreshold is typically 2347 octets, so all packets are considered "short" packets. Furthermore, the dot11ShortRetryLimit is 7 attempts. The device driver can periodically poll the MIB to read the values of dot11TransmittedFragmentCount, dot11FailedCount, dot11RetryCount, dot11RTSSuccessCount, dot11RTSFailureCount, dot11ACKFailureCount. During a given interval after a first transmission, the system may compute a delta value, denoted as "Ddot11 . . . " for each of the aforementioned counters, for example, Ddot11RetryCount for dot11RetryCount. The total number of packet attempts in an interval is then $N=D$dot11TransmittedFragmentCount+
$D$dot11FailedCount.

The success rate is:

$S=D$dot11TransmittedFragmentCount/$N$.

The number of failures is:

$F=D$dot11FailedCount+dot11RetryCount.

The CWhold is: CWhold=Ddot11FailedCount/F.
Consequently, the estimated CW is:

CW=CWhold*aCWmax+(1−CWhold)*(aCWmax−
aCWmin)/2.

Above is a coarse approximation of the CW value, but can be used to provide the R parameter comparisons between different nodes. Other estimates of the retransmission time based on using the dot11RTSFailureCount or other timers may provide more accurate estimates.

Process for Determining Routing Path in a Multi-Hop Network

Figure 4:
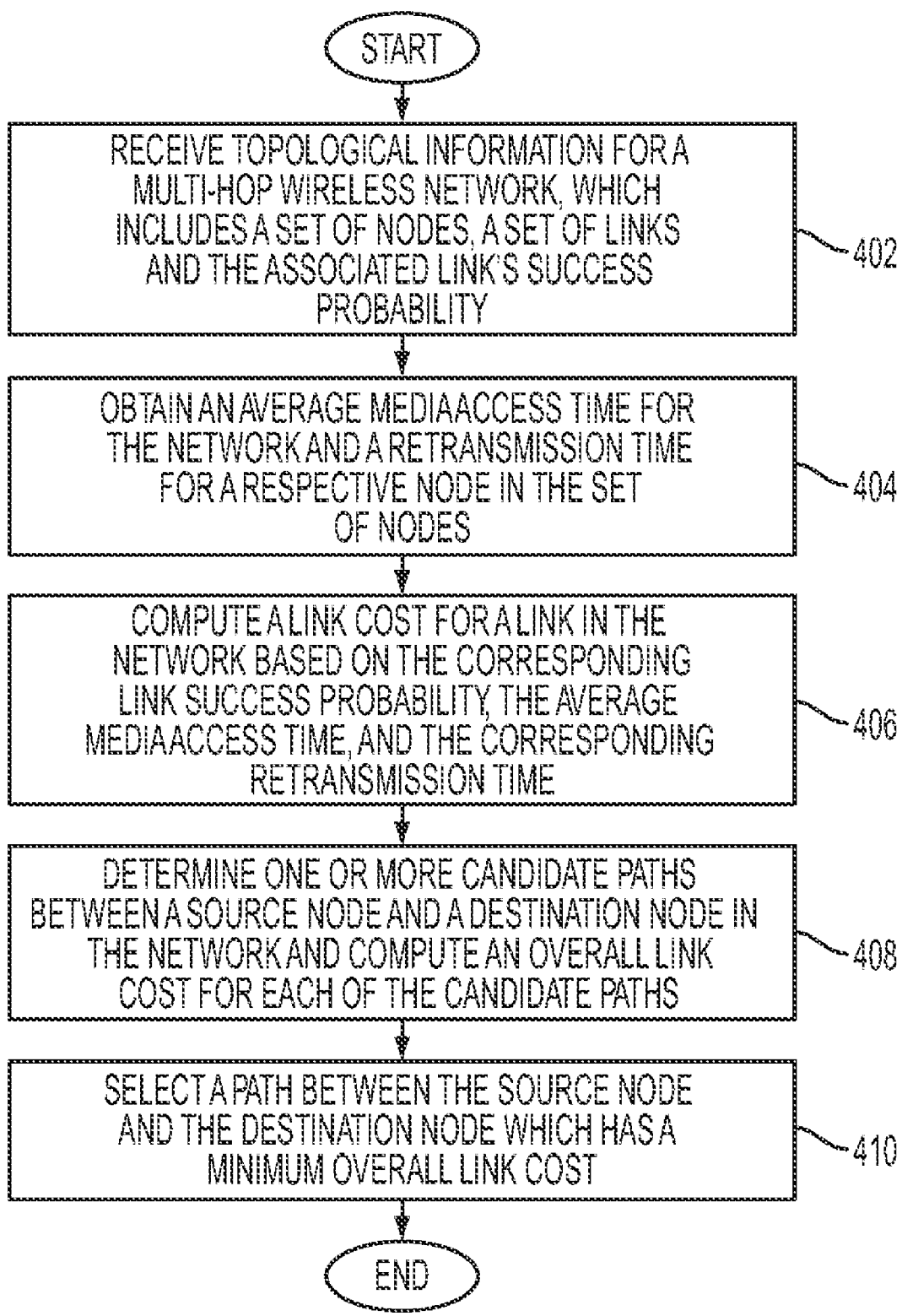
FIG. 4 presents a flowchart illustrating the process for determining a routing path in a multi-hop network using an ERT link metric in accordance with an embodiment of the present invention.

FIG. 4 presents a flowchart illustrating the process for determining a routing path in a multi-hop network using an ERT link metric in accordance with an embodiment of the present invention.

During operation, the system receives topological information associated with the multi-hop wireless network, wherein the topological information includes a set of nodes, a set of links and the associated link's success probability $p_i$ (step 402). The system also obtains an average media access time for the multi-hop wireless network (step 404). As mentioned above, the average media access time is approximately the time from when a MAC layer first receives a packet to the time when the packet is transmitted onto a transmission medium. The system additionally obtains a retransmission time for a respective node in the set of nodes (step 404). Also as described above, the retransmission time is approximately a delay required to retransmit a packet by a node after a failed transmission on an associated link. In one embodiment of the present invention, the system obtains a global average retransmission time for the set of nodes instead of obtaining a set of node-specific retransmission times.

Next, the system computes a link cost for a link in the multi-hop network based on the corresponding link success probability, the average media access time, and the corresponding retransmission time (step 406). In one embodiment of the present invention, the link cost for the link is the ERT metric. In one embodiment, the ERT metric is computed using Eqn. 1.

The system then determines one or more candidate paths between a source node and a destination node in the multi-hop network and computes an overall link cost for each of the candidate paths (step 408). In one embodiment, the system computes the overall link cost for a path by summing up a set of computed link cost values associated with the set of links in the path. Next, the system selects a path between the source node and the destination node which has a minimum overall link cost (step 410).

Figure 5:
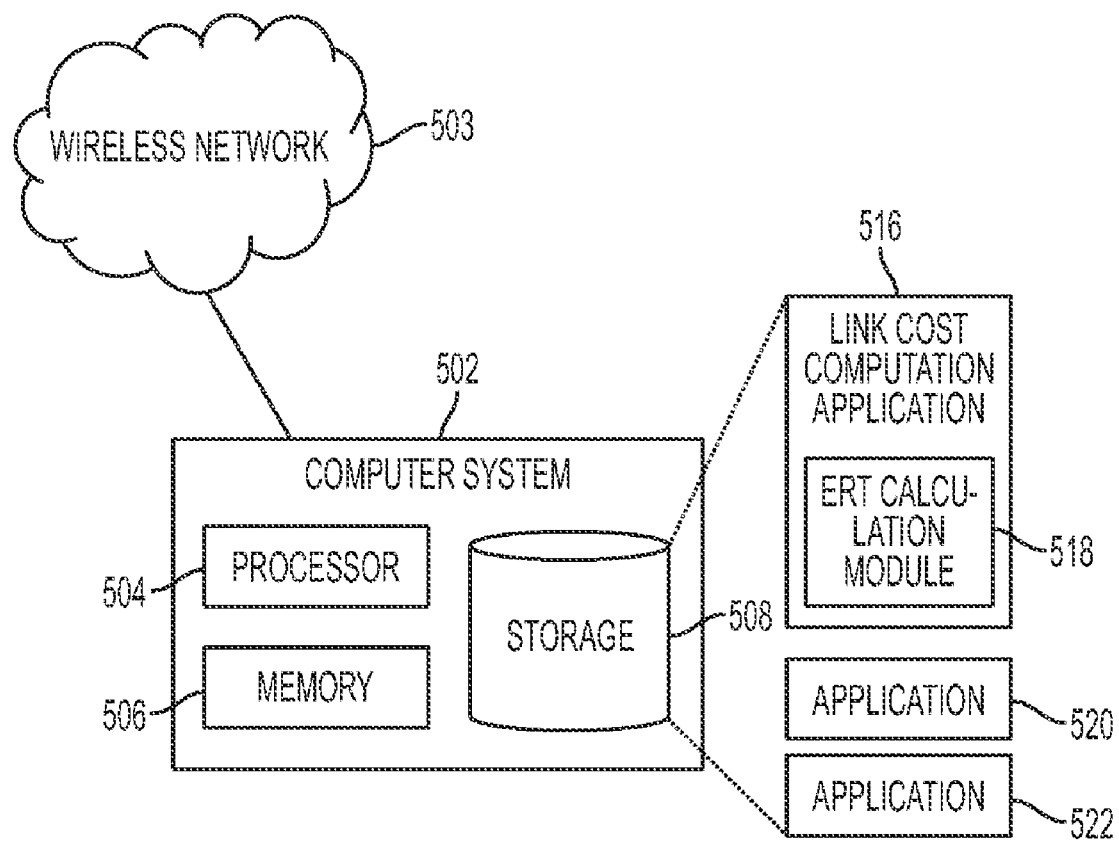
FIG. 5 illustrates a computer system for determining a routing path in a wireless network using an ERT link metric in accordance with one embodiment of the present invention.

FIG. 5 illustrates a computer system for determining a routing path in a wireless network using an ERT link metric in accordance with one embodiment of the present invention. A computer system 502 includes a processor 504, a memory 506, and a storage device 508. Computer system 502 is coupled to a wireless network 503. Storage device 508 stores a link cost computation application 516, which in one embodiment performs the ERT-based route computation. Link cost computation application 516 includes an ERT calculation module 518, which computes the ERT for the links between computer system 502 and wireless network 503. Storage device 508 also stores applications 520 and 522. During operation, link cost computation application 516 is loaded into memory 506 and executed by processor 504. Correspondingly, processor 504 computes ERT-based routes as described above.

Other Variations

In one embodiment of the present invention, The ERT metric may be modified to also taking into account congestion factor due to queuing latency at a receiver node.

In one embodiment of the present invention, instead of using the bi-directional reliability of a link, the expected number of failures associated with a success of transmitting a packet on the link may only depends on the forward reliability of the link.

In one embodiment of the present invention, the ERT metric can be made adaptive to traffic-class. For example, if a traffic does not use automatic repeat request (ARQ) (i.e., real time with FEC rather than ACKs, or unreliable traffic), the ERT is evaluated based on the forward reliability instead of the bi-direction reliability.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for computing link costs for a multi-hop wireless network, comprising:
   receiving topological information associated with the multi-hop wireless network, wherein the topological information specifies a set of nodes, a set of links, and a success probability pi for a respective link i which indicates the probability of successfully transmitting a packet from a first node coupled to the link to a second node coupled to the link;
   obtaining an average media access time for the multi-hop wireless network, wherein the average media access time is approximately the time from when a media access control (MAC) layer first receives a packet to the time when the packet is transmitted onto a transmission medium, wherein the average media access time correspond to an average value that is link-independent for the multi-hop wireless network;
   obtaining a retransmission time for a respective node in the set of nodes, wherein the retransmission time is approximately a delay associated with retransmitting a packet by a node after a failed transmission;
   computing a-an expected retransmission time (ERT) link metric value for a respective link, wherein the ERT link metric value has a direct relationship with the retransmission time associated with the link, with an expected number of failures associated with a successful packet transmission on the link and a constant, wherein the expected number of failures is computed based on the link's success probability, and wherein the constant in the direct relationship is the average media access time; and
   producing a link cost for the link based on the ERT link metric value for the link, thereby facilitating more efficient routing through the multi-hop wireless network.

2. The method of claim 1, wherein the method further comprises determining a routing path between a source node and a destination node in the multi-hop wireless network based on the link costs associated with the set of links by:
   finding one or more paths between the source node and the destination node;
   computing an overall link cost for each of the paths; and
   selecting a path between the source node and the destination node which has a minimum overall link cost.

3. The method of claim 1, wherein the wireless network is a time division multiple access (TDMA)-based network, and wherein obtaining the retransmission time for the node involves computing the retransmission time as a function of one or more of:
   a congestion window size;

a slot time within a TDMA frame; and
a time slot schedule.

4. The method of claim 1, wherein the wireless network is a contention-based network (such as a 802.11 based-network), and wherein obtaining the retransmission time for the node involves computing the retransmission time as a function of one or more of:
- a congestion window size;
- a congestion backoff time; and
- an error backoff time (such as an extended inter-frame space (EIFS)).

5. The method of claim 1, wherein the retransmission time is substantially equal to a back-off time for the multi-hop wireless network.

6. The method of claim 1, wherein computing the link metric value for the link involves computing an expected retransmission time (ERT) based on the following formula:

ERT=$E_f \times R + Q$, wherein $E_f$ represents an expected number of failures associated with a successful packet transmission on the link;
wherein R represents the retransmission time associated with the link;
wherein Q represents the average media access time for the multi-hop wireless network; and
wherein the computed link metric value has a unit of time.

7. The method of claim 6, wherein $E_f$ is computed based on the link's success probability $p_i$ under a geometric distribution.

8. The method of claim 7, wherein $E_f$ is computed according to formula:

$$E_f = \frac{1 - p_i}{p_i}.$$

9. The method of claim 7, wherein the link's success probability $p_i$ is computed based on a packet success probability for a forward link within the link and a packet success probability for a reverse link within the link.

10. A non-transitory computer-readable storage medium storing instructions that when executed by a computer cause the computer to perform a method for computing link costs for a multi-hop wireless network, the method comprising:
receiving topological information associated with the multi-hop wireless network, wherein the topological information specifies a set of nodes, a set of links, and a success probability pi for a respective link i which indicates the probability of successfully transmitting a packet from a first node coupled to the link to a second node coupled to the link;
obtaining an average media access time for the multi-hop wireless network, wherein the average media access time is approximately the time from when a media access control (MAC) layer first receives a packet to the time when the packet is transmitted onto a transmission medium, wherein the average media access time correspond to an average value that is link-independent for the multi-hop wireless network;
obtaining a retransmission time for a respective node in the set of nodes, wherein the retransmission time is approximately a delay associated with retransmitting a packet by a node after a failed transmission;
computing an expected retransmission time (ERT) link metric value for a respective link, wherein the ERT link metric value has a direct relationship with the retransmission time associated with the link, with an expected number of failures associated with a successful packet transmission on the link and a constant, wherein the expected number of failures is computed based on the link's success probability, and wherein the constant in the direct relationship is the average media access time; and
producing a link cost for the link based on the ERT link metric value for the link, thereby facilitating more efficient routing through the multi-hop wireless network.

11. The computer-readable storage medium of claim 10, wherein the method further comprises determining a routing path between a source node and a destination node in the multi-hop wireless network based on the link costs associated with the set of links by:
finding one or more paths between the source node and the destination node;
computing an overall link cost for each of the paths; and
selecting a path between the source node and the destination node which has a minimum overall link cost.

12. The computer-readable storage medium of claim 10, wherein the wireless network is a time division multiple access (TDMA)-based network, and wherein obtaining the retransmission time for the node involves computing the retransmission time as a function of one or more of:
- a congestion window size;
- a slot time within a TDMA frame; and
- a time slot schedule.

13. The computer-readable storage medium of claim 10, wherein the wireless network is a contention-based network (such as a 802.11 based-network), and wherein obtaining the retransmission time for the node involves computing the retransmission time as a function of one or more of:
- a congestion window size;
- a congestion backoff time; and
- an error backoff time (such as an extended inter-frame space (EIFS)).

14. The computer-readable storage medium of claim 10, wherein the retransmission time is substantially equal to a back-off time for the multi-hop wireless network.

15. The computer-readable storage medium of claim 10, wherein computing the link metric value for the link involves computing an expected retransmission time (ERT) based on the following formula:

ERT=$E_f \times R + Q$, wherein $E_f$ represents an expected number of failures associated with a successful packet transmission on the link;
wherein R represents the retransmission time associated with the link;
wherein Q represents the average media access time for the multi-hop wireless network; and
wherein the computed link metric value has a unit of time.

16. The computer-readable storage medium of claim 15, wherein $E_f$ is computed based on the link's success probability $p_i$ under a geometric distribution.

17. The computer-readable storage medium of claim 16, wherein $E_f$ is computed based on formula:

$$E_f = \frac{1 - p_i}{p_i}.$$

18. The computer-readable storage medium of claim 16, wherein the link's success probability $p_i$ is computed based on a packet success probability for a forward link within the link and a packet success probability for a reverse link within the link.

19. A system that computes link costs for a multi-hop wireless network, comprising:
- a receiving mechanism configured to receive topological information associated with the multi-hop wireless network, wherein the topological information specifies a set of nodes, a set of links, and a success probability pi for a respective link i which indicates the probability of successfully transmitting a packet from a first node coupled to the link to a second node coupled to the link;
- an obtaining mechanism configured to obtain an average media access time for the multi-hop wireless network, wherein the average media access time is approximately the time from when a media access control (MAC) layer first receives a packet to the time when the packet is transmitted onto a transmission medium, wherein the average media access time correspond to an average value that is link-independent for the multi-hop wireless network,
- wherein the obtaining mechanism is further configured to obtain a retransmission time for a respective node in the set of nodes, wherein the retransmission time is approximately a delay associated to retransmitting a packet by a node after a failed transmission;
- a computing mechanism configured to compute an expected retransmission time (ERT) link metric value for a respective link, wherein the ERT link metric value has a direct relationship with the retransmission time associated with the link, with an expected number of failures associated with a successful packet transmission on the link and a constant, wherein the expected number of failures is computed based on the link's success probability, and wherein the constant in the direct relationship is the average media access time; and
- a producing mechanism configured to produce a link cost for the link based on the ERT link metric value for the link, thereby facilitating more efficient routing through the multi-hop wireless network.

20. The system of claim 19, further comprising a determination mechanism configured to determine a routing path between a source node and a destination node in the multi-hop wireless network based on the link costs associated with the set of links by:
- finding one or more paths between the source node and the destination node;
- computing an overall link cost for each of the paths; and
- selecting a path between the source node and the destination node which has a minimum overall link cost.

* * * * *